(No Model.)
J. HARVEY.
SIEVE CLEANING ATTACHMENT.
No. 254,009. Patented Feb. 21, 1882.
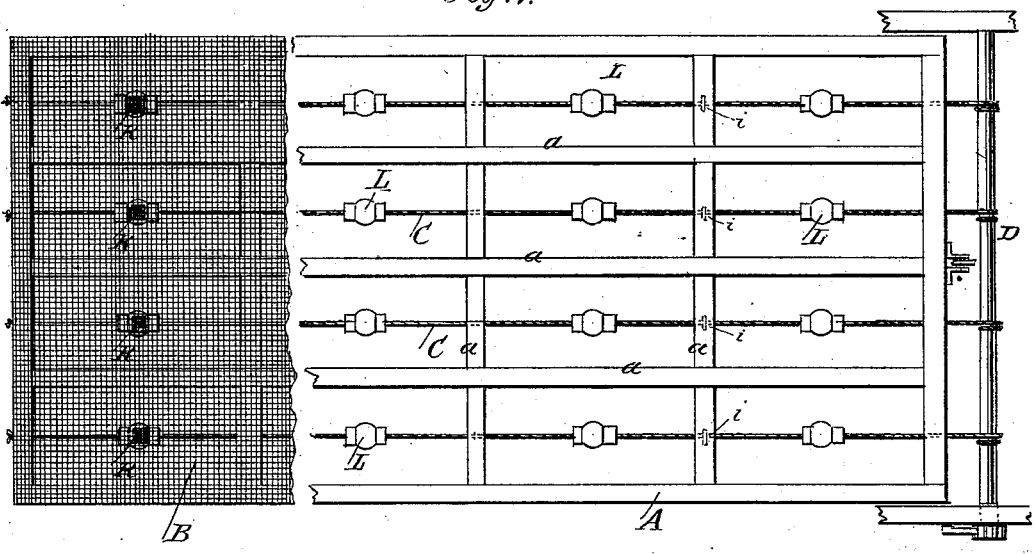
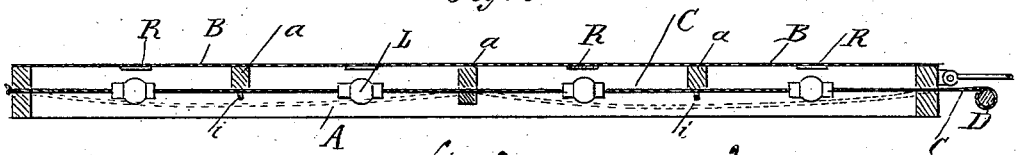
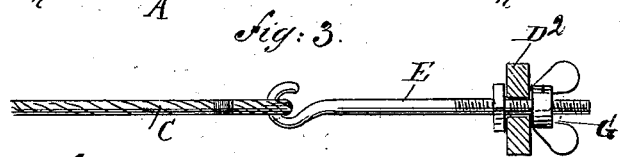
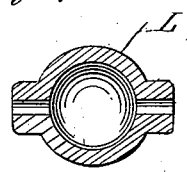
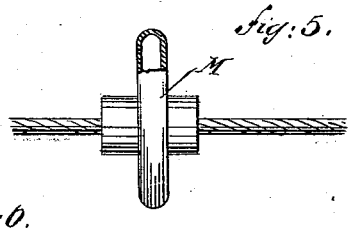
Witnesses:
Clarence H Crysler
Austin G Crysler
Inventor:
John Harvey
E. R. Brown
by
Attorney.
N. PETERS. Photo-Lithographer, Washington, D. C.

UNITED STATES PATENT OFFICE.

JOHN HARVEY, OF BROOKLYN, NEW YORK.

SIEVE-CLEANING ATTACHMENT.

SPECIFICATION forming part of Letters Patent No. 254,009, dated February 21, 1882.

Application filed November 8, 1881. (No model.)

*To all whom it may concern:*

Be it known that I, JOHN HARVEY, of Brooklyn, in the county of Kings and State of New York, have invented certain new and useful Improvements in Sieve-Cleaning Attachments; and I do hereby declare that the following is a full, clear, and exact description thereof.

My invention relates to a means for preventing the clogging of the meshes of a sieve or a bolting-cloth, such as are used in flour-bolting machines, middlings-purifiers, and apparatus of a similar character. For this purpose various devices have been employed, such as reciprocating brushes, air-blasts, grains of corn, wheat, or pease, and balls arranged to travel in the sections or compartments of the screen, and to bound against the cloth so as to clear the meshes thereof.

My invention consists essentially in the employment of bulbs or disks attached to a rope or cord, arranged to alternately slacken and tighten, so as to cause said bulbs or disks to strike the cloth and clear the meshes; and, further, in certain novel details of construction and operation of parts, as hereinafter more particularly described.

The accompanying drawings illustrate the manner of carrying out my invention.

Figure 1 represents a top view of a reciprocating sieve with my improvements applied thereto. Fig. 2 is a longitudinal vertical section of the same. Figs. 3, 4, 5, and 6 are detail views, hereinafter referred to.

The sieve-frame A is provided with longitudinal and transverse strengthening-braces $a$, which divide it into sections or compartments, over which the bolting-cloth B is secured. The sieve is provided with suitable means for reciprocating it in the usual manner.

C represents a rope or cord, which may be of any suitable material. One end of this rope or cord is attached to the foot of the sieve-frame by means of a knot or a staple, or in any other suitable manner. The other end is passed under the various braces $a$ and through the head of the sieve-frame, and is then attached to a rod or bar, D, as shown in Figs. 1 and 2, or to a hook, E, as shown in Fig. 3. When attached to the rod or bar D the rope or cord C is tightened by rotating said rod or bar. In such case the ropes or cords which pass through the various sections of the sieve are tightened simultaneously and uniformly. When attached to the hook E said hook is screw-threaded and passes through a stationary bar or beam, $D^2$, with a thumb-nut, G, on one side and a jam-nut, H, on the other side of said bar or beam. In either case the rope or cord C may be provided with a rubber spring, washer, or cushion, located at either end of the same, as may be preferred. When the ropes or cords are attached to the hooks they may be tightened independently of each other. Each longitudinal division of the sieve is provided with one of the ropes or cords C, and each rope or cord carries a number of clearing devices, one for each section or subdivision of the sieve. The clearing device may consist of a hollow elastic bulb, L, as shown in Figs. 1, 2, and 4, a hollow elastic disk, M, as shown in Fig. 5, or a solid disk, P, provided with an elastic peripherical band, $p$, as shown in Fig. 6. In each case the bulb or disk is provided with a hub, which fits tightly on the rope or cord and prevents displacement thereon.

The operation of my invention is as follows: The rope or cord C, having been stretched taut while the sieve is at its lowest position, when the apparatus is in motion the cord or rope is alternately slackened and tightened as the sieve is reciprocated back and forth or upward and downward. As the cord or rope tightens the bulbs L or the disks M or P strike the center of the under side of each section of the sieve, so as to clear the meshes and prevent clogging thereof.

In order to prevent the wearing of the cloth by the action of the bulbs or disks each section of the sieve is provided with a pad or cushion, R, which may be of cloth, leather, rubber, or any suitable material, and may be attached in any suitable manner to the portion of the sieve which receives the stroke of the bulb or disk.

If desired, the ropes or cords may be arranged transversely instead of longitudinally of the sieve, and provided with any suitable means for operating them.

Having thus described my invention, what I claim as new, and desire to secure by Letters Patent, is—

1. The combination of a shaking sieve, a rope or cord attached at one end thereto and at the other end to a fixed object, and one or more bulbs or disks mounted upon said cord and adapted to strike said sieve as the cord is alternately slackened and tightened by the motions of said sieve, substantially as set forth.

2. The combination, with the shaking sieve, the cord or cords, and one or more bulbs or disks attached thereto, of one or more pads or cushions attached to the cloth of sieve to prevent injury thereto from the action of the bulb or disk, as set forth.

JOHN HARVEY.

Witnesses:
E. R. BROWN,
JAMES H. HUNTER.